(12) United States Patent
Nishiwaki

(10) Patent No.: US 9,075,238 B2
(45) Date of Patent: Jul. 7, 2015

(54) FLUORESCENCE MICROSCOPE

(75) Inventor: Daisuke Nishiwaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 719 days.

(21) Appl. No.: 13/311,057

(22) Filed: Dec. 5, 2011

(65) Prior Publication Data

US 2012/0145923 A1 Jun. 14, 2012

(30) Foreign Application Priority Data

Dec. 8, 2010 (JP) ................................ 2010-273197

(51) Int. Cl.
*G01N 21/64* (2006.01)
*G02B 21/16* (2006.01)
*G02B 27/28* (2006.01)

(52) U.S. Cl.
CPC .............. *G02B 21/16* (2013.01); *G02B 27/283* (2013.01)

(58) Field of Classification Search
USPC ...................................................... 250/458.1
See application file for complete search history.

(56) References Cited

U.S. PATENT DOCUMENTS

| | | | |
|---|---|---|---|
| 5,235,399 A * | 8/1993 | Usui et al. .................. 356/45 |
| 5,863,504 A * | 1/1999 | Heffelfinger et al. ...... 422/82.08 |
| 6,025,917 A | 2/2000 | Toyonaga et al. |
| 7,746,553 B2 | 6/2010 | Wolleschensky |
| 2002/0181101 A1 * | 12/2002 | Appel ........................... 359/487 |
| 2003/0226977 A1 | 12/2003 | Storz et al. |
| 2005/0224721 A1 | 10/2005 | Aoki |
| 2008/0062511 A1 | 3/2008 | Wolleschensky |

FOREIGN PATENT DOCUMENTS

| | | |
|---|---|---|
| EP | 1 882 970 A1 | 1/2008 |
| JP | 8-254654 | 10/1996 |
| JP | 2008-33263 A | 2/2008 |
| WO | 9813676 A1 | 4/1998 |
| WO | 2008108846 A1 | 9/2008 |

OTHER PUBLICATIONS

Japanese Office Action dated May 20, 2014 issued in counterpart Japanese Application No. 2010-273197.
Extended European Search Report (EESR) dated Mar. 2, 2012 (in English) in counterpart European Application No. 11009597.3.

* cited by examiner

*Primary Examiner* — David Porta
*Assistant Examiner* — Shun Lee
(74) *Attorney, Agent, or Firm* — Holtz, Holtz, Goodman & Chick PC

(57) ABSTRACT

A fluorescence microscope includes: a light source that emits excitation light for exciting a sample; an optical detector that detects fluorescence emitted from the sample excited by the excitation light; a first wavelength selection filter arranged in an optical path leading from the light source to the sample to reflect at least an S-polarized component of the excitation light and transmit the fluorescence; and a second wavelength selection filter arranged in an optical path between the optical detector and the first wavelength selection filter to reflect at least the S-polarized component of the excitation light and transmit the fluorescence. In the fluorescence microscope, light entering and transmitted through the first wavelength selection filter as P-polarized light enters the second wavelength selection filter as S-polarized light.

7 Claims, 6 Drawing Sheets

FLUORESCENCE MICROSCOPE

CROSS REFERENCE TO RELATED APPLICATIONS

This application is based upon and claims the benefit of priority from the prior Japanese Patent Application No. 2010-273197, filed Dec. 8, 2010, the entire contents of which are incorporated herein by this reference.

BACKGROUND OF THE INVENTION

1. Field of the Invention

The present invention relates to a fluorescence microscope, and more particularly, to a fluorescence microscope including a wavelength selection filter inclined with respect to light.

2. Description of the Related Art

As a general configuration of a fluorescence microscope, there is known a configuration in which a dichroic mirror is inclined at 45 degrees with respect to the optical axis of incident light (excitation light and fluorescence) at a position where an illumination optical path and an observation optical path intersect. In the configuration, the dichroic mirror can reflect the excitation light toward a sample, and can also transmit the fluorescence emitted from the sample and guide the fluorescence to a detector since the fluorescence has a different wavelength from that of the excitation light projected onto the sample.

FIGS. 1A and 1B are views illustrating the wavelength characteristics of a dichroic mirror inclined with respect to light. The dichroic mirror functioning as a wavelength selection filter is normally formed of interference films. Thus, when light enters the dichroic mirror at an inclined angle, wavelength characteristics with respect to P-polarized light and S-polarized light differ from each other, and a reflection band for the S-polarized light is wider than a reflection band for the P-polarized light in the wavelength characteristics as illustrated in FIGS. 1A and 1B.

When the fluorescence microscope is a laser microscope, a laser beam as excitation light is emitted as linearly-polarized light. Meanwhile, fluorescence emitted from a sample is randomly-polarized light. Excitation light reflected from the sample or the like (referred to as return light below so as to be distinguished from the excitation light that travels from a light source toward the sample) is also randomly-polarized light due to the influence of scattering at a sample surface or the like.

To ensure a widest transmission band for the fluorescence as the randomly-polarized light, the characteristic with a wider reflection band with respect to the S-polarized light is preferably designed according to the excitation wavelength of the laser beam, to allow the laser beam to enter the dichroic mirror as the S-polarized light. FIG. 1A illustrates the wavelength characteristics of the dichroic mirror designed according to the laser beam as the S-polarized light.

In the wavelength characteristics illustrated in FIG. 1A, the reflection band for the S-polarized light is limited to a narrow band including the excitation wavelength. Thus, high transmittance is achieved for the fluorescence wavelength. On the other hand, the reflection band for the P-polarized light is narrower than the band of the excitation wavelength. Thus, a P-polarized component of the return light is partially transmitted through the dichroic mirror together with the fluorescence. Therefore, the fluorescence and the return light cannot be completely separated only by using the dichroic mirror having the wavelength characteristics illustrated in FIG. 1A.

To block the return light by reflecting the return light at the dichroic mirror, the characteristic with respect to the P-polarized light, which is a narrower reflection band than that with respect to the P-polarized light, is preferably designed according to the excitation wavelength of the laser beam. FIG. 1B illustrates the wavelength characteristics of the dichroic mirror designed according to the laser beam as the P-polarized light.

In the wavelength characteristics illustrated in FIG. 1B, both the reflection band for the S-polarized light and the reflection band for the P-polarized light include the excitation wavelength. Thus, the dichroic mirror can reflect the excitation light toward the sample, and can also block the return light. Meanwhile, the reflection band for the S-polarized light is formed wider than that in the wavelength characteristics illustrated in FIG. 1A. Thus, a portion of the band of the fluorescence wavelength is included in the reflection band for the S-polarized light. An S-polarized component of the fluorescence is thereby partially reflected by the dichroic mirror and blocked together with the return light. Therefore, when the dichroic mirror having the wavelength characteristics illustrated in FIG. 1B is used, the detection efficiency of the entire apparatus for the fluorescence is lowered.

As described above, in the dichroic mirror inclined with respect to the light, it is difficult to achieve high transmittance for the fluorescence wavelength and also block the return light due to a difference between the wavelength characteristics with respect to the S-polarized light and the P-polarized light.

To solve the problem, as a general configuration of the fluorescence microscope, a barrier filter that blocks the return light is arranged on the detector side of the dichroic mirror along with the dichroic mirror having the wavelength characteristics illustrated in FIG. 1A for achieving high transmittance for the fluorescence wavelength. With the configuration, high detection efficiency can be achieved for the fluorescence, and the return light can be also blocked.

Japanese Patent Laid-Open No. 2008-33263 discloses the configuration of a fluorescence-testing scanning laser microscope including a beam splitter that is arranged such that the incident angle of illumination light and/or sample light at a splitter surface is smaller than 45 degrees. Generally, as the incident angle is smaller, the difference between the wavelength characteristics with respect to the S-polarized light and the P-polarized light is decreased. With the configuration disclosed in Japanese Patent Laid-Open No. 2008-33263, high detection efficiency can be achieved for the fluorescence, and the return light can be also more reliably blocked by arranging the beam splitter in such a manner as to reduce the incident angle.

SUMMARY OF THE INVENTION

According to one aspect of the present invention, a fluorescence microscope includes: a light source that emits excitation light for exciting a sample; an optical detector that detects fluorescence emitted from the sample excited by the excitation light; a first wavelength selection filter arranged in an optical path leading from the light source to the sample to reflect at least an S-polarized component of the excitation light and transmit the fluorescence; and a second wavelength selection filter arranged in an optical path between the optical detector and the first wavelength selection filter to reflect at least the S-polarized component of the excitation light and transmit the fluorescence, wherein light entering and transmitted through the first wavelength selection filter as P-polarized light enters the second wavelength selection filter as S-polarized light.

BRIEF DESCRIPTION OF THE DRAWINGS

The present invention will be more apparent from the following detailed description when the accompanying drawings are referenced.

DESCRIPTION OF THE PREFERRED EMBODIMENTS

Figure 2:
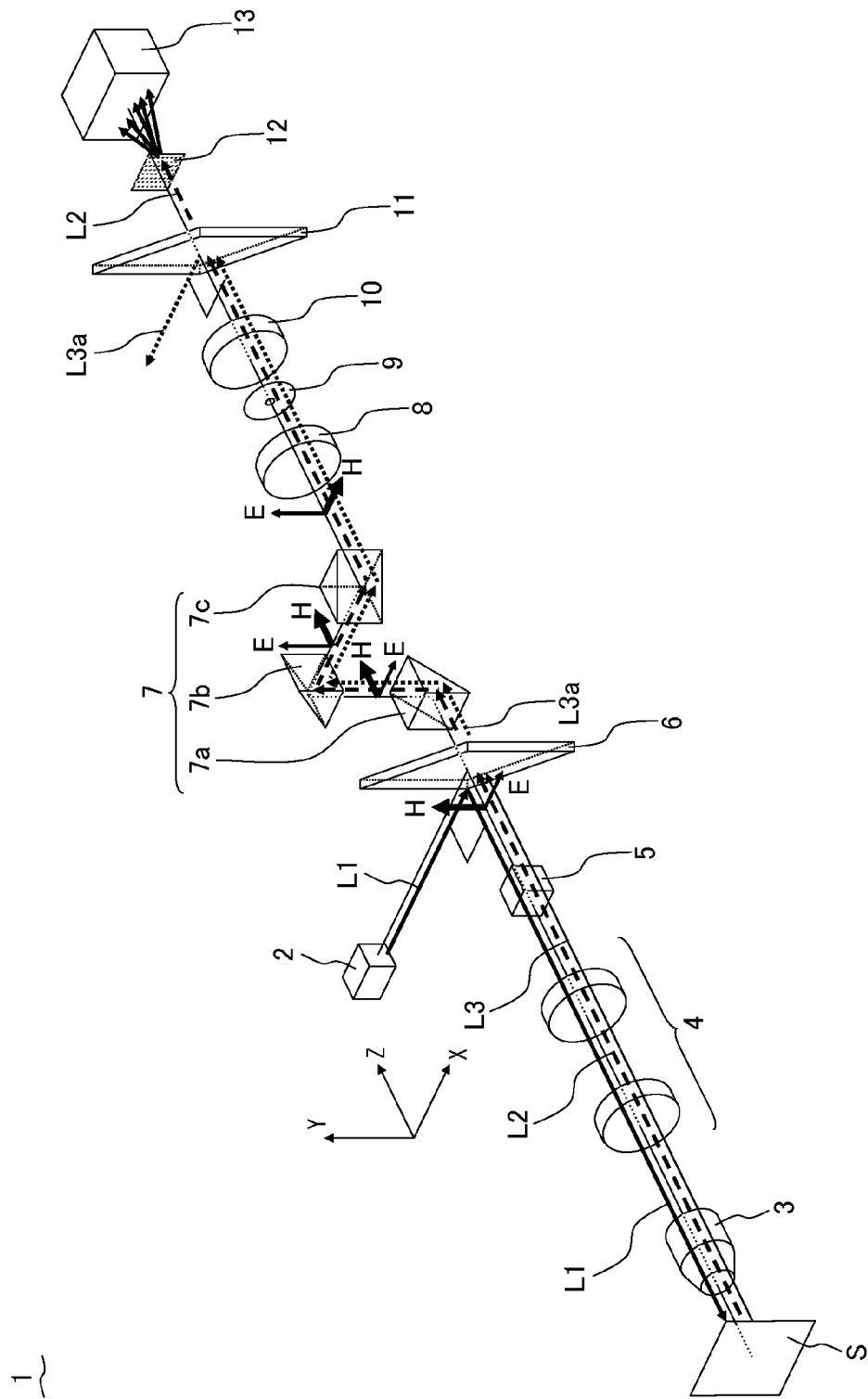
FIG. 2 is a view illustrating the configuration of a fluorescence microscope according to a first embodiment.

FIG. 2 is a view illustrating the configuration of a fluorescence microscope according to a present embodiment. An XYZ coordinate system in FIG. 2 is a left-handed Cartesian coordinate system provided for the convenience of directional reference.

A fluorescence microscope 1 illustrated in FIG. 2 is a fluorescence microscope used for observing a sample S by detecting fluorescence L2 emitted from the sample S that is excited by excitation light L1. The fluorescence microscope 1 includes a light source 2 that emits the excitation light L1 for exciting the sample S, an objective lens 3, a relay optical system 4, a scanning device 5 that scans the sample S in the XY directions perpendicular to the optical axis, a dichroic mirror 6 (a first wavelength selection filter) arranged in an optical path leading from the light source 2 to the sample S, a polarization plane rotating unit 7 that rotates the polarization plane of incident light 90 degrees, a lens 8, a pinhole 9 arranged at a conjugated position with the front-side focal position of the objective lens 3, a lens 10, a wavelength selection filter 11 (a second wavelength selection filter), a diffraction grating 12, and an optical detector 13 that detects the fluorescence L2.

The light source 2 is a laser, and can emit an S-polarized laser beam as the excitation light toward the dichroic mirror 6. The scanning device 5 is a galvano-mirror, for example. The optical detector 13 is a photomultiplier tube having a plurality of channels, for example.

Figure 1A:
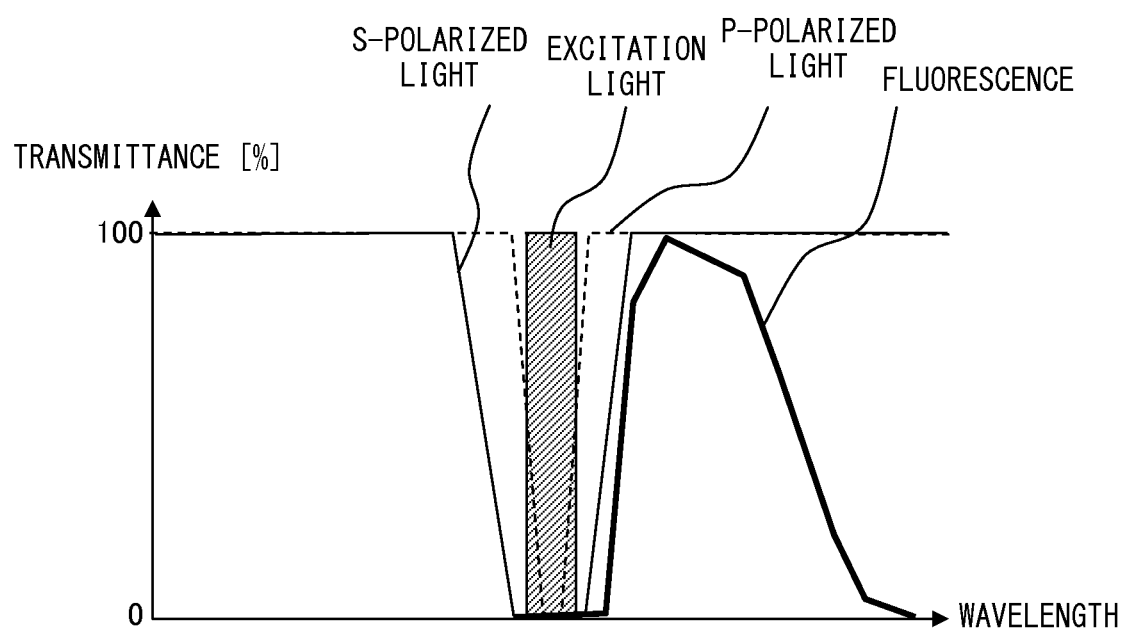
FIG. 1A is a view illustrating the wavelength characteristics of a dichroic mirror inclined with respect to light.

The dichroic mirror 6 is a dichroic mirror whose wavelength characteristic with respect to S-polarized light is designed according to the excitation wavelength. To be more specific, the dichroic mirror 6 has such wavelength characteristics as to reflect at least an S-polarized component of the excitation light L1 and transmit the fluorescence L2. That is, the dichroic mirror 6 has a reflection band including the excitation wavelength with respect to the S-polarized light, and a transmission band including the entire fluorescence wavelength with respect to the S-polarized light and P-polarized light. It is normally difficult for the dichroic mirror 6 having such characteristics to fully reflect excitation light entering as the P-polarized light as illustrated in FIG. 1A.

The wavelength selection filter 11 is a wavelength selection filter whose wavelength characteristic with respect to the S-polarized light is designed according to the excitation wavelength. The wavelength selection filter 11 is arranged in an optical path between the optical detector 13 and the dichroic mirror 6. To be more specific, the wavelength selection filter 11 has such wavelength characteristics as to reflect at least the S-polarized component of the excitation light L1 and transmit the fluorescence L2. That is, the wavelength selection filter 11 has a reflection band including the excitation wavelength with respect to the S-polarized light, and a transmission band including the entire fluorescence wavelength with respect to the S-polarized light and the P-polarized light.

In the fluorescence microscope 1, the dichroic mirror 6 and the wavelength selection filter 11 are arranged parallel to each other. That is, the normal line of the dichroic mirror 6 and the normal line of the wavelength selection filter 11 are parallel to each other. To be more specific, the dichroic mirror 6 and the wavelength selection filter 11 are respectively inclined at 45 degrees with respect to the incident optical axis of the fluorescence L2. In other words, the normal line of the dichroic mirror 6 and the incident optical axis of the fluorescence L2 entering the dichroic mirror 6 form an angle of 45 degrees, and the normal line of the wavelength selection filter 11 and the incident optical axis of the fluorescence L2 entering the wavelength selection filter 11 form an angle of 45 degrees.

The polarization plane rotating unit 7 includes three total reflection prisms (a prism 7a, a prism 7b, and a prism 7c), which are in such a positional relationship as to be twisted 90 degrees from each other. The polarization plane rotating unit 7 is arranged in the optical path between the dichroic mirror 6 and the wavelength selection filter 11. The polarization plane rotating unit 7 rotates the polarization plane of incident light 90 degrees around the incident optical axis (the Z axis), and emits in a direction (the Z direction) parallel to the incident direction the light whose polarization plane has been rotated.

Therefore, when light whose oscillation direction E of an electric field is the X direction (an oscillation direction H of a magnetic field is the Y direction) enters the polarization plane rotating unit 7, the polarization plane rotating unit 7 converts the light into light whose oscillation direction E of an electric field is the Y direction (an oscillation direction H of a magnetic field is the X direction), and emits the light in the direction (the Z direction) parallel to the incident direction. When light whose oscillation direction E of an electric field is the Y direction (an oscillation direction H of a magnetic field is the X direction) enters the polarization plane rotating unit 7, the polarization plane rotating unit 7 converts the light into light whose oscillation direction E of an electric field is the X direction (an oscillation direction H of a magnetic field is the Y direction), and emits the light in the direction (the Z direction) parallel to the incident direction.

Accordingly, in the fluorescence microscope 1, the light entering and transmitted through the dichroic mirror 6 as the P-polarized light enters the wavelength selection filter 11 as the S-polarized light, and the light entering and transmitted through the dichroic mirror 6 as the S-polarized light enters the wavelength selection filter 11 as the P-polarized light.

In the following, the operation of the fluorescence microscope 1 will be described.

The excitation light L1 emitted from the light source 2 enters the dichroic mirror 6 as the S-polarized light. Since the dichroic mirror 6 has the reflection band including the excitation wavelength with respect to the S-polarized light, the dichroic mirror 6 reflects the excitation light L1 toward the sample S. The excitation light L1 reflected by the dichroic mirror 6 enters the objective lens 3 via the scanning device 5 and the relay optical system 4. The objective lens 3 projects the excitation light L1 to the sample S while concentrating the excitation light L1 onto the sample S.

The sample S excited by the excitation light L1 emits the fluorescence L2 as randomly-polarized light, and also reflects the excitation light L1 to generate return light L3 as randomly-polarized light. The return light L3 may be also generated from an optical device such as the objective lens 3 and the relay optical system 4 which the excitation light L1 enters.

The fluorescence L2 and the return light L3 as the randomly-polarized light enter the dichroic mirror 6 via the objective lens 3, the relay optical system 4, and the scanning device 5.

Since the dichroic mirror 6 has the transmission band including the entire fluorescence wavelength with respect to the S-polarized light and the P-polarized light, the fluorescence L2 entering the dichroic mirror 6 is transmitted through the dichroic mirror 6 regardless of its polarization direction. The polarization plane of the fluorescence L2 transmitted through the dichroic mirror 6 is rotated 90 degrees by the polarization plane rotating unit 7. Since the fluorescence L2 entering the polarization plane rotating unit 7 is the randomly-polarized light, the fluorescence L2 emitted from the polarization plane rotating unit 7 is also the randomly-polarized light.

The fluorescence L2 emitted from the polarization plane rotating unit 7 is concentrated by the lens 8. The pinhole 9 blocks fluorescence generated from other than the focal plane. The fluorescence L2 passing through the pinhole 9 enters the wavelength selection filter 11 as the randomly-polarized light via the lens 10.

Since the wavelength selection filter 11 has the transmission band including the entire fluorescence wavelength with respect to the S-polarized light and the P-polarized light, the fluorescence L2 entering the wavelength selection filter 11 is transmitted through the wavelength selection filter 11 regardless of its polarization direction. The fluorescence L2 transmitted through the wavelength selection filter 11 is separated into each wavelength by the diffraction grating 12, enters the optical detector 13 and is detected therein.

As described above, in the fluorescence microscope 1, the fluorescence L2 enters the optical detector 13 almost without being attenuated by the dichroic mirror 6 or the wavelength selection filter 11. Therefore, the fluorescence microscope 1 can achieve high detection efficiency for the fluorescence.

Meanwhile, the return light L3 entering the dichroic mirror 6 is divided into light reflected by the dichroic mirror 6 and light transmitted through the dichroic mirror 6.

To be more specific, since the dichroic mirror 6 has the reflection band including the excitation wavelength with respect to the S-polarized light, an S-polarized component of the return light L3 entering the dichroic mirror 6 is reflected by the dichroic mirror 6 and thereby excluded from the detection optical path. Meanwhile, a P-polarized component of the return light L3 entering the dichroic mirror 6 cannot be fully reflected, and is partially (referred to as return light L3$a$ below) transmitted through the dichroic mirror 6.

The return light L3$a$ transmitted through the dichroic mirror 6 is the light entering the dichroic mirror 6 as the P-polarized light. Thus, the light enters the polarization plane rotating unit 7 as the light whose oscillation direction E of the electric field is the X direction (the oscillation direction H of the magnetic field is the Y direction).

The polarization plane rotating unit 7 rotates the polarization plane of the return light L3$a$ 90 degrees around the incident optical axis (the Z axis), and emits in the direction (the Z direction) parallel to the incident direction the light whose polarization plane has been rotated.

To be more specific, the return light L3$a$ is converted into light whose oscillation direction H of the magnetic field is the Z direction (the oscillation direction E of the electric field is the X direction) when reflected in the Y direction by the prism 7$a$. The light is converted into light whose oscillation direction E of the electric field is the Y direction (the oscillation direction H of the magnetic field is the Z direction) when reflected in the X direction by the prism 7$b$. The light is converted into light whose oscillation direction H of the magnetic field is the X direction (the oscillation direction E of the electric field is the Y direction) when reflected in the Z direction by the prism 7$c$. The light is then emitted in the Z direction.

The return light L3$a$ emitted from the polarization plane rotating unit 7 enters the wavelength selection filter 11 via the lens 8, the pinhole 9, and the lens 10. Since the return light L3$a$ is the light whose oscillation direction E of the electric field is the Y direction (the oscillation direction H of the magnetic field is the X direction), the return light L3$a$ enters the wavelength selection filter 11 as the S-polarized light.

Since the wavelength selection filter 11 has the reflection band including the excitation wavelength with respect to the S-polarized light, the return light L3$a$ entering the wavelength selection filter 11 as the S-polarized light is reflected by the wavelength selection filter 11 and thereby excluded from the detection optical path.

As described above, in the fluorescence microscope 1, the light entering the dichroic mirror 6 as the P-polarized light enters the wavelength selection filter 11 as the S-polarized light with the polarization plane being rotated by the polarization plane rotating unit 7. Accordingly, the S-polarized component of the return light L3 entering the dichroic mirror 6 as the randomly-polarized light is fully reflected by the dichroic mirror 6, and a portion of the P-polarized component (the return light L3$a$) transmitted through the dichroic mirror 6 is fully reflected by the wavelength selection filter 11 which the portion enters as the S-polarized light. The return light can be thereby reliably blocked.

Figure 1B:
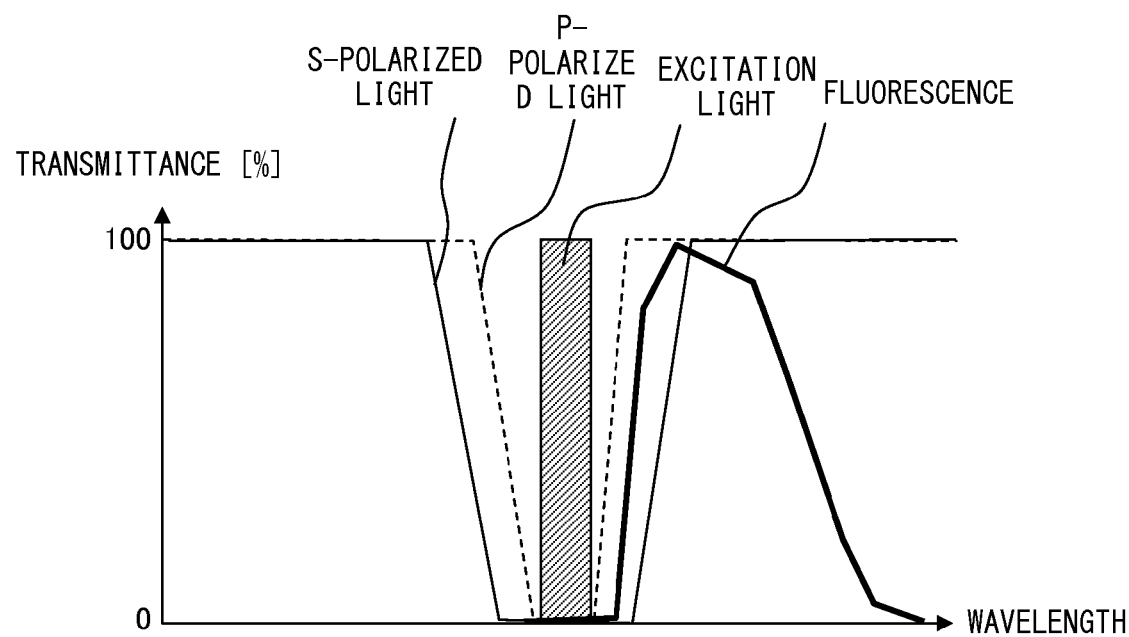
FIG. 1B is a view illustrating the wavelength characteristics of another dichroic mirror inclined with respect to light.

As described above, with the fluorescence microscope 1 according to the present embodiment, high detection efficiency can be achieved for the fluorescence and the return light can be also blocked. The dichroic mirror 6 and the wavelength selection filter 11 are only required to be designed in consideration of the wavelength characteristic of the S-polarized light with regard to the excitation wavelength. Thus, as is clear from the comparison of the wavelength characteristics illustrated in FIGS. 1A and 1B, the width of the reflection band can be reduced. Accordingly, high transmittance can be achieved for the entire fluorescence wavelength, and the layer number of interference films can be also reduced.

Since the dichroic mirror 6 and the wavelength selection filter 11 are inclined at 45 degrees with respect to the incident optical axis in the fluorescence microscope 1, optical paths intersect with each other at 90 degrees at the dichroic mirror 6 or the wavelength selection filter 11. Therefore, the configuration of the fluorescence microscope 1 is not complicated.

Also, unlike in the conventional technique in which the dichroic mirror inclined with respect to the optical axis and the barrier filter arranged perpendicular to the optical axis are combined, the fluorescence microscope 1 does not include filters arranged at different angles from each other with respect to the optical axis. Thus, a wasted space is not generated.

In the fluorescence microscope 1, the dichroic mirror 6 and the wavelength selection filter 11 are only required to have such wavelength characteristics as to reflect at least the S-polarized component of the excitation light L1 and transmit the fluorescence L2. That is, the reflection band of the dichroic mirror 6 with respect to the S-polarized light and the reflection band of the wavelength selection filter 11 with respect to the S-polarized light may be equal to each other. Therefore, the dichroic mirror 6 and the wavelength selection filter 11 may be formed of interference films having the same wavelength characteristics and the same film compositions, or a common component may be used for the dichroic mirror 6 and the wavelength selection filter 11. Accordingly, fewer types of wavelength selection filters are required, and the productivity of the fluorescence microscope 1 can be improved. Exactly the same optical device may be used for the dichroic mirror 6 and the wavelength selection filter 11.

In the fluorescence microscope 1, the dichroic mirror 6 and the wavelength selection filter 11 are arranged parallel to each other. However, the dichroic mirror 6 and the wavelength selection filter 11 may not be necessarily arranged parallel to each other as long as the light entering the dichroic mirror 6 as the P-polarized light enters the wavelength selection filter 11 as the S-polarized light such that the return light can be blocked regardless of the polarization direction. In consideration of the fact that the polarization plane rotating unit 7 rotates the polarization plane 90 degrees, a plane (an XZ plane) including the normal line of the dichroic mirror 6 (a line on the XZ plane) and the incident optical axis (the Z axis) of the fluorescence entering the dichroic mirror 6, and a plane (an XZ plane) including the normal line of the wavelength selection filter 11 (a line on the XZ plane) and the incident optical axis (the Z axis) of the fluorescence entering the wavelength selection filter 11 are only required to be parallel to each other. Therefore, the dichroic mirror 6 and the wavelength selection filter 11 may be arranged at different inclined angles from each other as long as the Y axis is employed as the rotation axis.

Although the polarization plane rotating unit 7 includes the prism in the fluorescence microscope 1, the polarization plane rotating unit 7 may also include a mirror. Although the polarization plane rotating unit 7 has three reflection surfaces, the number of reflection surfaces is not limited to three. When the polarization plane rotating unit 7 has at least two reflection surfaces, the fluorescence can enter the dichroic mirror 6 and the wavelength selection filter 11, which employ the Y axis as the rotation axis, as polarized light with different polarization directions from each other. Thus, the polarization plane rotating unit 7 is only required to have at least two reflection surfaces.

In the fluorescence microscope 1, the dichroic mirror 6 and the wavelength selection filter 11 are not limited to the notch filter having the wavelength characteristics as illustrated in FIG. 1A. As long as the dichroic mirror 6 and the wavelength selection filter 11 have such wavelength characteristics as to reflect at least the S-polarized component of the excitation light L1 and transmit the fluorescence L2, a multi-bandpass filter, a single-bandpass filter, or a long-wave pass filter may be employed, for example. When the dichroic mirror 6 and the wavelength selection filter 11 are used in a multiphoton excitation microscope, a short-wave pass filter may be employed.

Embodiment 2

Figure 3:
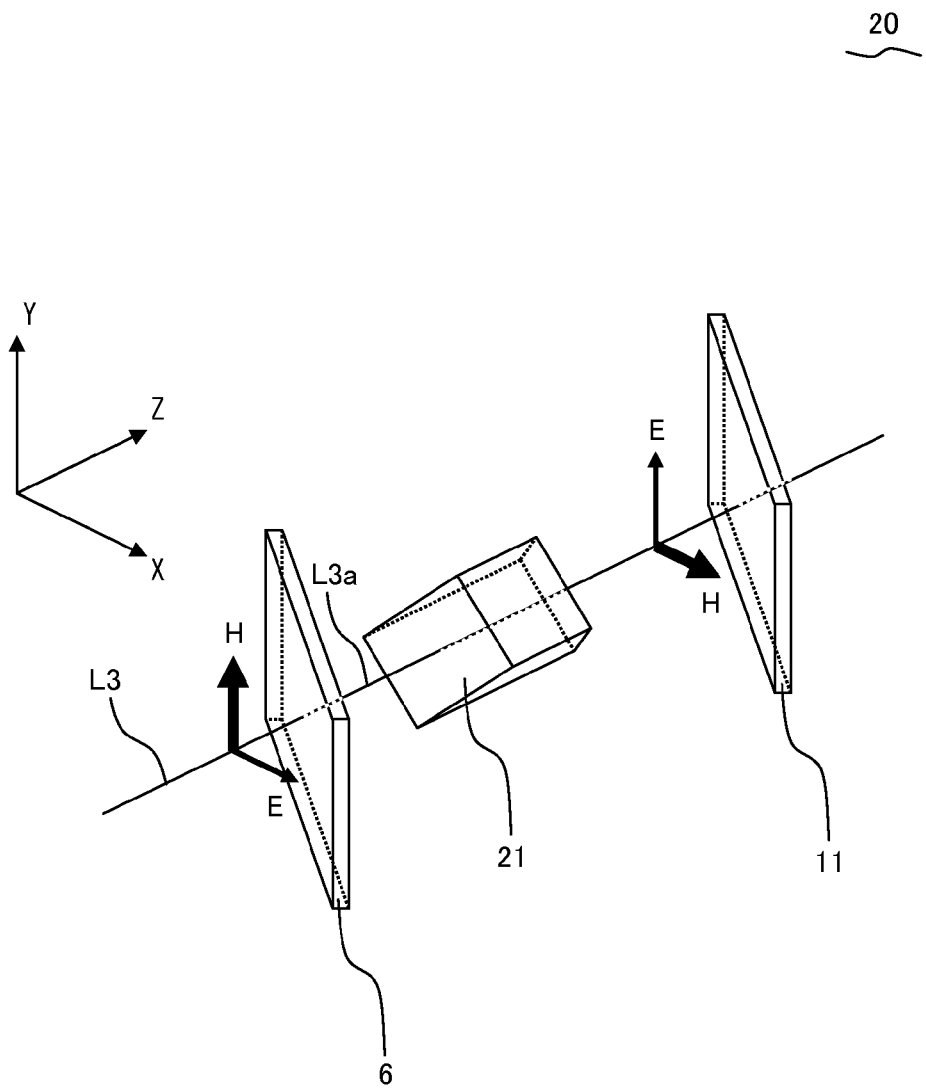
FIG. 3 is a view illustrating a portion of the configuration of a fluorescence microscope according to a second embodiment.

FIG. 3 is a view illustrating a portion of the configuration of a fluorescence microscope according to a present embodiment. An XYZ coordinate system in FIG. 3 is a left-handed Cartesian coordinate system provided for the convenience of directional reference.

A fluorescence microscope 20 illustrated in FIG. 3 has the same configuration as that of the fluorescence microscope 1 illustrated in FIG. 2 except that an image rotator 21 is provided instead of the polarization plane rotating unit 7 including the prisms. Therefore, FIG. 3 shows only the configuration between the dichroic mirror 6 and the wavelength selection filter 11. The lens 8, the pinhole 9, and the lens 10 are omitted in FIG. 3.

The image rotator 21 is an optical device that rotates an optical image by reflection or refraction. The image rotator 21 functions as a polarization plane rotating unit that rotates the polarization plane 90 degrees like the polarization plane rotating unit 7.

In the fluorescence microscope 20 illustrated in FIG. 3, the return light L3a transmitted through the dichroic mirror 6 is the light entering the dichroic mirror 6 as the P-polarized light. Thus, the light enters the image rotator 21 as the light whose oscillation direction E of the electric field is the X direction (the oscillation direction H of the magnetic field is the Y direction).

The image rotator 21 can rotate an image obtained from its emission surface twice the rotation angle of the image rotator when rotated around the Z axis. Thus, when the image rotator is rotated 45 degrees, a unit vector in the X direction is converted into a unit vector in the −Y direction, and a unit vector in the Y direction is converted into a unit vector in the X direction. Thus, the return light L3a is converted into the light whose oscillation direction E of the electric field is the Y direction (the oscillation direction H of the magnetic field is the X direction), and emitted in the Z direction from the image rotator 21.

The return light L3a emitted from the image rotator 21 enters the wavelength selection filter 11 via the lens 8, the pinhole 9 and the lens 10 (not shown). Since the return light L3a is the light whose oscillation direction E of the electric field is the Y direction (the oscillation direction H of the magnetic field is the X direction), the return light L3a enters the wavelength selection filter 11 as the S-polarized light. Accordingly, the return light L3a entering the wavelength selection filter 11 as the S-polarized light is reflected by the wavelength selection filter 11 and thereby excluded from the detection optical path.

As described above, in the fluorescence microscope 20, the light entering the dichroic mirror 6 as the P-polarized light enters the wavelength selection filter 11 as the S-polarized light with the polarization plane being rotated by the image rotator 21. Accordingly, the fluorescence microscope 20 can reliably block the return light in a similar manner to the fluorescence microscope 1 illustrated in FIG. 2.

As described above, the fluorescence microscope 20 according to the present embodiment can produce the same effects as those of the fluorescence microscope 1 according to the first embodiment. The same changes as those in the fluorescence microscope 1 may be also made in the fluorescence microscope 20.

Embodiment 3

Figure 4:
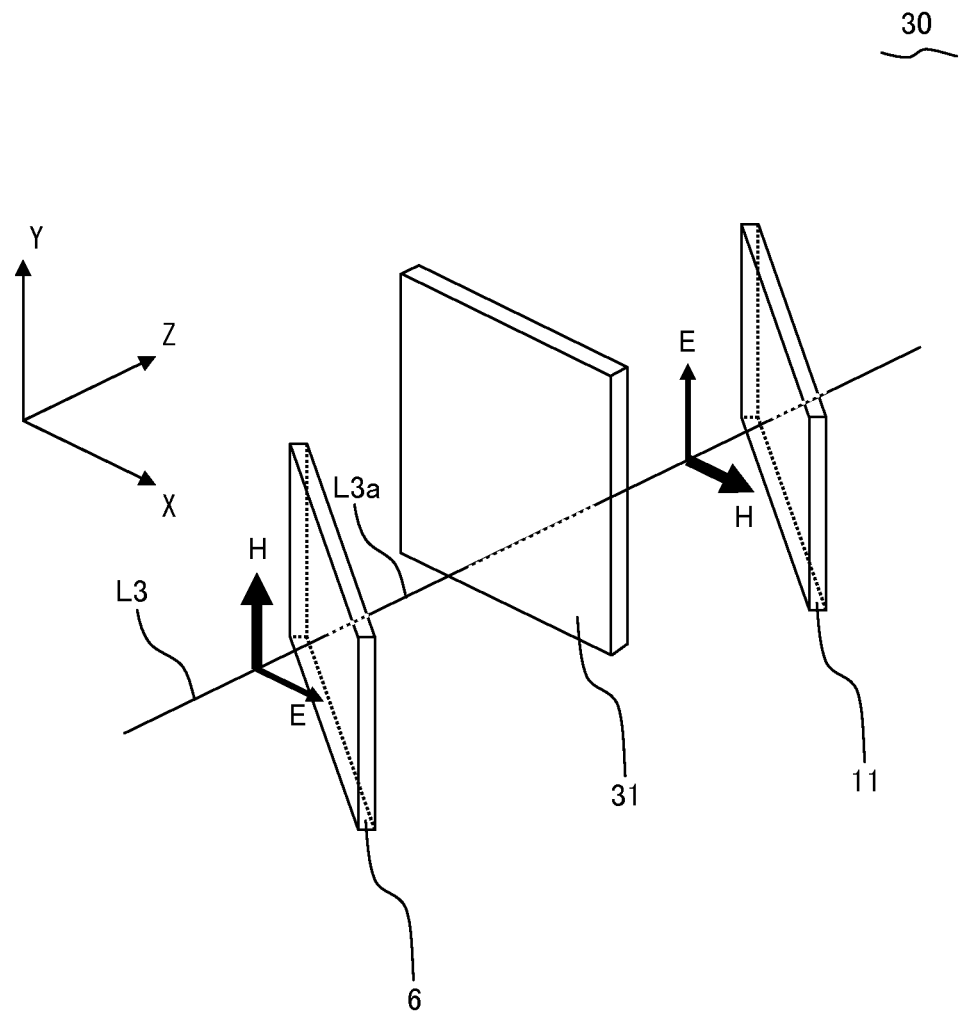
FIG. 4 is a view illustrating a portion of the configuration of a fluorescence microscope according to a third embodiment.

FIG. 4 is a view illustrating a portion of the configuration of a fluorescence microscope according to a present embodiment. An XYZ coordinate system in FIG. 4 is a left-handed Cartesian coordinate system provided for the convenience of directional reference.

A fluorescence microscope 30 illustrated in FIG. 4 has the same configuration as that of the fluorescence microscope 1 illustrated in FIG. 2 except that a half wavelength plate 31 is provided instead of the polarization plane rotating unit 7 including the prisms. Therefore, FIG. 4 shows only the configuration between the dichroic mirror 6 and the wavelength selection filter 11. The lens 8, the pinhole 9, and the lens 10 are omitted in FIG. 4.

The half wavelength plate 31 is an optical device that generates a 180-degree phase difference to the light having the excitation wavelength. The half wavelength plate 31 functions as a polarization plane rotating unit that rotates the polarization plane of the return light 90 degrees.

In the fluorescence microscope 30 illustrated in FIG. 4, the return light L3a transmitted through the dichroic mirror 6 is the light entering the dichroic mirror 6 as the P-polarized light. Thus, the light enters the half wavelength plate 31 as the light whose oscillation direction E of the electric field is the X direction (the oscillation direction H of the magnetic field is the Y direction). The return light L3a entering the half wavelength plate 31 is converted into the light whose oscillation direction E of the electric field is the Y direction (the oscillation direction H of the magnetic field is the X direction), and emitted in the Z direction from the half wavelength plate 31.

The return light L3a emitted from the half wavelength plate 31 enters the wavelength selection filter 11 via the lens 8, the pinhole 9, and the lens 10 (not shown). Since the return light L3a is the light whose oscillation direction E of the electric field is the Y direction (the oscillation direction H of the magnetic field is the X direction), the return light L3a enters the wavelength selection filter 11 as the S-polarized light. Accordingly, the return light L3a entering the wavelength selection filter 11 as the S-polarized light is reflected by the wavelength selection filter 11 and thereby excluded from the detection optical path.

As described above, in the fluorescence microscope 30, the return light entering the dichroic mirror 6 as the P-polarized light enters the wavelength selection filter 11 as the S-polarized light with the polarization plane being rotated by the half wavelength plate 31. Accordingly, the fluorescence microscope 30 can reliably block the return light in a similar manner to the fluorescence microscope 1 illustrated in FIG. 2.

As described above, the fluorescence microscope 30 according to the present embodiment can produce the same effects as those of the fluorescence microscope 1 according to the first embodiment. The same changes as those in the fluorescence microscope 1 may be also made in the fluorescence microscope 30.

Embodiment 4

Figure 5:
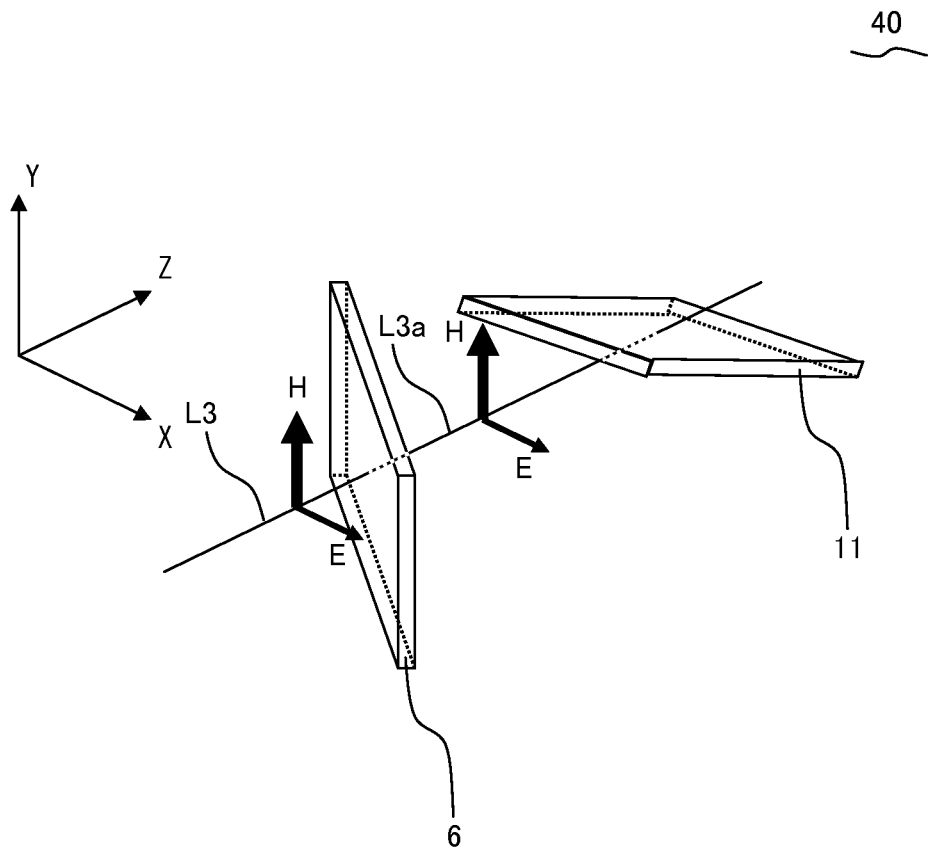
FIG. 5 is a view illustrating a portion of the configuration of a fluorescence microscope according to a fourth embodiment.

FIG. 5 is a view illustrating a portion of the configuration of a fluorescence microscope according to a present embodiment. An XYZ coordinate system in FIG. 5 is a left-handed Cartesian coordinate system provided for the convenience of directional reference.

A fluorescence microscope 40 illustrated in FIG. 5 has the same configuration as that of the fluorescence microscope 1 illustrated in FIG. 2 except that the polarization plane rotating unit 7 including the prisms is removed and that the wavelength selection filter 11 is inclined with respect to the dichroic mirror 6. Therefore, FIG. 5 shows only the configuration between the dichroic mirror 6 and the wavelength selection filter 11. The lens 8, the pinhole 9, and the lens 10 are omitted in FIG. 5.

While the dichroic mirror 6 is inclined at 45 degrees with respect to the incident optical axis (the Z axis) with the Y axis as the rotation axis, the wavelength selection filter 11 is inclined at 45 degrees with respect to the incident optical axis (the Z axis) with the X axis as the rotation axis. That is, the plane (the XZ plane) including the normal line of the dichroic mirror 6 and the incident optical axis (the Z axis) of the fluorescence entering the dichroic mirror 6, and a plane (a YZ plane) including the normal line of the wavelength selection filter 11 and the incident optical axis (the Z axis) of the fluorescence entering the wavelength selection filter 11 are perpendicular to each other.

In the fluorescence microscope 40 illustrated in FIG. 5, since the return light L3a transmitted through the dichroic mirror 6 is the light entering the dichroic mirror 6 as the P-polarized light, the light enters the wavelength selection filter 11 via the lens 8, the pinhole 9, and the lens 10 (not shown) as the light whose oscillation direction E of the electric field is the X direction (the oscillation direction H of the magnetic field is the Y direction).

In the wavelength selection filter 11, the oscillation direction H of the magnetic field is a direction parallel to an incident plane (a plane defined by the normal line and the traveling direction of light, i.e., the YZ plane here), and the oscillation direction E of the electric field is a direction perpendicular to the incident plane. Therefore, the light whose oscillation direction E of the electric field is the X direction (the oscillation direction H of the magnetic field is the Y direction) enters the wavelength selection filter 11 as the S-polarized light. Accordingly, the return light L3a entering the wavelength selection filter 11 as the S-polarized light is reflected by the wavelength selection filter 11 and thereby excluded from the detection optical path.

As described above, in the fluorescence microscope 40, although the polarization plane is not rotated between the dichroic mirror 6 and the wavelength selection filter 11, the light enters the dichroic mirror 6 and the wavelength selection filter 11 with different polarization directions from each other since the dichroic mirror 6 and the wavelength selection filter 11 are inclined around different rotation axes (the X axis and the Y axis) perpendicular to the incident optical axis (the Z axis). Therefore, the fluorescence microscope 40 can reliably block the return light in a similar manner to the fluorescence microscope 1 illustrated in FIG. 2.

As described above, the fluorescence microscope 40 according to the present embodiment can also produce the same effects as those of the fluorescence microscope 1 according to the first embodiment.

In the fluorescence microscope 40, the dichroic mirror 6 and the wavelength selection filter 11 are inclined at 45 degrees with respect to the incident optical axis (the Z axis) respectively with the Y axis and the X axis as the rotation axis. However, the present invention is not limited thereto as long as the light entering the dichroic mirror 6 as the P-polarized light enters the wavelength selection filter 11 as the S-polarized light such that the return light can be blocked regardless of the polarization direction. Thus, the dichroic mirror 6 and the wavelength selection filter 11 may be arranged at different inclined angles as long as the Y axis and the X axis are respectively employed as the rotation axis.

In the fluorescence microscope 40, the dichroic mirror 6 and the wavelength selection filter 11 are not limited to the notch filter having the wavelength characteristics as illustrated in FIG. 1A. As long as the dichroic mirror 6 and the wavelength selection filter 11 have such wavelength characteristics as to reflect at least the S-polarized component of the excitation light L1 and transmit the fluorescence L2, a multi-bandpass filter, a single-bandpass filter, or a long-wave pass filter may be employed, for example. When the dichroic mirror 6 and the wavelength selection filter 11 are used in a multiphoton excitation microscope, a short-wave pass filter may be employed.

What is claimed is:

1. A fluorescence microscope comprising:
    a light source that emits excitation light for exciting a sample;
    an optical detector that detects fluorescence emitted from the sample excited by the excitation light;
    a first wavelength selection filter that is arranged in an optical path leading from the light source to the sample and that reflects at least an S-polarized component of the excitation light and transmits the fluorescence;
    a second wavelength selection filter that is arranged in an optical path between the optical detector and the first wavelength selection filter and that reflects at least the S-polarized component of the excitation light and transmits the fluorescence; and
    a polarization plane rotating unit that is arranged in an optical path between the first wavelength selection filter and the second wavelength selection filter and that rotates a polarization plane of light by 90 degrees with an optical axis as a rotation axis such that a P-polarized component of the excitation light which entered and was transmitted through the first wavelength selection filter is converted to an S-polarized component of the excitation light by the polarization plane rotating unit and said converted S-polarized component of the excitation light is incident on the second wavelength selection filter and is reflected by the second wavelength selection filter,
    wherein a plane including a normal line of the first wavelength selection filter and an incident optical axis of the fluorescence entering the first wavelength selection filter, and a plane including a normal line of the second wavelength selection filter and an incident optical axis of the fluorescence entering the second wavelength selection filter are parallel to each other; and
    wherein the normal line of the first wavelength selection filter and the normal line of the second wavelength selection filter are parallel to each other.

2. The fluorescence microscope according to claim 1, wherein the normal line of the first wavelength selection filter and the incident optical axis of the fluorescence entering the first wavelength selection filter form an angle of 45 degrees, and the normal line of the second wavelength selection filter and the incident optical axis of the fluorescence entering the second wavelength selection filter form an angle of 45 degrees.

3. The fluorescence microscope according to claim 1, wherein the polarization plane rotating unit is an image rotator.

4. The fluorescence microscope according to claim 1, wherein the polarization plane rotating unit is a half wavelength plate.

5. The fluorescence microscope according to claim 1, wherein the polarization plane rotating unit has at least two reflection surfaces.

6. The fluorescence microscope according to claim 1, wherein a reflection band of the first wavelength selection filter with respect to the S-polarized light and a reflection band of the second wavelength selection filter with respect to the S-polarized light are equal to each other.

7. The fluorescence microscope according to claim 6, wherein the first wavelength selection filter and the second wavelength selection filter are formed of interference films having the same film compositions with the same wavelength characteristics.

* * * * *